United States Patent
Krey

(10) Patent No.: US 9,921,417 B2
(45) Date of Patent: Mar. 20, 2018

(54) OPTICAL IMAGE STABILIZER AND CAMERA MODULE INCLUDING THE SAME

(71) Applicant: SAMSUNG ELECTRO-MECHANICS CO., LTD., Suwon-si (KR)

(72) Inventor: Ruslan Krey, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 83 days.

(21) Appl. No.: 15/009,959

(22) Filed: Jan. 29, 2016

(65) Prior Publication Data

US 2016/0248980 A1 Aug. 25, 2016

(30) Foreign Application Priority Data

Feb. 23, 2015 (KR) .................... 10-2015-0025185

(51) Int. Cl.
*G02B 27/64* (2006.01)
*G03B 17/02* (2006.01)

(52) U.S. Cl.
CPC ........... *G02B 27/646* (2013.01); *G03B 17/02* (2013.01); *G03B 2217/005* (2013.01)

(58) Field of Classification Search
CPC .................. G02B 27/646; G02B 17/02; G02B 2217/005; H04N 5/232; H04N 5/23264; H04N 5/23287; H04N 5/23258
See application file for complete search history.

(56) References Cited

U.S. PATENT DOCUMENTS

2009/0245772 A1* 10/2009 Lee .................... G03B 17/00
396/55
2016/0057445 A1* 2/2016 Tsubaki ............... H04N 19/521
382/236

FOREIGN PATENT DOCUMENTS

JP       2010-273395 A     12/2010
JP        2012-48138 A      3/2012

* cited by examiner

*Primary Examiner* — Christopher K Peterson
(74) *Attorney, Agent, or Firm* — NSIP Law

(57) ABSTRACT

An optical image stabilizer including an offset remover configured to remove a direct current offset of an angular velocity signal and output a corrected angular velocity signal; an idle state determiner configured to determine a moving-state or an idle state of the optical image stabilizer based on the corrected angular velocity signal; a switching filter configured to filter the corrected angular velocity signal using a second filter during a stabilization time and subsequently filter the corrected angular velocity signal using a first filter switched from the second filter when the optical image stabilizer is in the moving-state; and an integrator configured to integrate the filtered corrected angular velocity signal from the switching filter to output an angular position signal.

20 Claims, 7 Drawing Sheets

OPTICAL IMAGE STABILIZER AND CAMERA MODULE INCLUDING THE SAME

CROSS-REFERENCE TO RELATED APPLICATION

This application claims the benefit under 35 U.S.C 119(a) of Korean Patent Application No. 10-2015-0025185 filed on Feb. 23, 2015, in the Korean Intellectual Property Office, the entire disclosure of which is incorporated herein by reference for all purposes.

BACKGROUND

1. Field

The following description relates to an optical image stabilizer and a camera module including the same.

2. Description of Related Art

Since a camera module mounted in a mobile device has a lens aperture smaller than that of a general camera, an amount of light entering such a camera module mounted in the mobile device is less than that of a general camera at the time of capturing an image. Therefore, camera modules mounted in the mobile device commonly have relatively slow shutter speeds in order to compensate for an insufficient amount of light therein. However, in this case, distortion of an image may be generated even with fine hand-shake, such that it may be difficult to obtain a clear image.

In order to suppress deterioration of the image due to the fine hand-shake and obtain a clearer image, various optical image stabilization methods have been developed. Such a method is to use an optical image stabilization (OIS) processor providing an optical hand-shake correction function.

The OIS processor may use an angular velocity sensor to sense fine vibrations caused by movement such as hand-shake and calibrate an optical path of the camera module by a mechanical method, based on the sensed vibrations, to correct image distortion. However, since an output of the angular velocity sensor includes a bias offset to correct a bias error, in a case in which an angular position is calculated by integrating an angular velocity signal obtained by the angular velocity sensor, the bias offset is integrated therewith, such that errors of the angular position may be amplified over time.

Therefore, the angular velocity signal is quantized and subsequently passes through a high pass filter (HPF), such that the bias offset of the angular velocity signal may be removed, as disclosed in Japanese Patent Publication No. 2012-48138.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical image stabilizer in which a transient response time by a bias offset at the time of driving initiation of the optical image stabilizer is shortened, and a camera module includes the same.

In another general aspect, an optical image stabilizer includes an offset remover configured to remove a direct current offset of an angular velocity signal and output a corrected angular velocity signal; an idle state determiner configured to determine a moving-state or an idle state of the optical image stabilizer based on the corrected angular velocity signal; a switching filter configured to filter the corrected angular velocity signal using a second filter during a stabilization time and subsequently filter the corrected angular velocity signal using a first filter switched from the second filter when the optical image stabilizer is in the moving-state; and an integrator configured to integrate the filtered corrected angular velocity signal from the switching filter to output an angular position signal.

In another general aspect, a camera module includes an offset remover configured to remove a direct current offset of an angular velocity signal and output a corrected angular velocity signal; an idle state determiner configured to determine a movement state or idle state of the camera module based on the corrected angular velocity signal; a switching filter configured to filter the corrected angular velocity signal using a second filter during a stabilization time and subsequently filtering the corrected angular velocity signal using a first filter switched from the second filter, when the camera module is in the moving-state; an integrator configured to integrate the filtered corrected angular velocity signal from the switching filter to output an angular position signal; a lens controller configured to output a control signal based on the angular position signal; and a lens module configured to adjust a position of a lens barrel according to the control signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
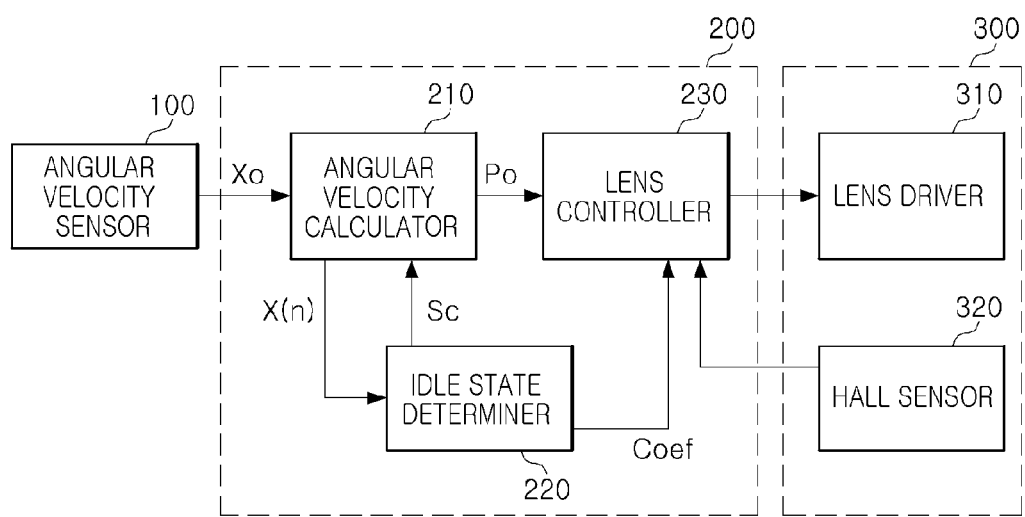
FIG. 1 is a block diagram illustrating an example of a camera module.

Referring to FIG. 1, a camera module includes an angular velocity sensor 100, an optical image stabilizer 200, and a lens module 300. Here, the optical image stabilizer 200 includes an angular velocity calculator 210, an idle state determiner 220, and a lens controller 230. In addition, the lens module 300 includes a lens driver 310 and a position sensor 320. The position sensor may be a Hall sensor.

The angular velocity sensor 100 detects an angular velocity and outputs an angular velocity signal Xo to the optical image stabilizer 200. The angular velocity sensor 100 detects shaking of a mobile device or a camera, may be a two, three or more-axis gyro sensor, and serves to detect an angular velocity of movement.

The angular velocity calculator 210 receives an output of the angular velocity sensor 100 and outputs an angular position signal Po generated by integrating the angular velocity signal Xo. Here, the angular velocity calculator 210 corrects the angular velocity signal Xo in order to remove a bias offset included in the angular velocity signal Xo from a noise component at the time of detecting a rotation angle of the angular velocity sensor 100. The angular velocity calculator 210 integrates a corrected angular velocity signal X(n) generated by correcting the angular velocity signal Xo, thereby calculating the angular position signal Po.

For instance, the angular velocity calculator 210 outputs the corrected angular velocity signal X(n), in which the bias offset has been removed, to the idle state determiner 220, and outputs the angular position signal Po, generated by integrating the corrected angular velocity signal X(n), to the lens controller 230.

The idle state determiner 220 determines a moving-state or idle state of the camera module based on the corrected angular velocity signal X(n). The idle state determiner 220 sums the corrected angular velocity signals X(n) during a predetermined time, or sums squared values of the corrected angular velocity signal X(n) during a predetermined time, and compares the data obtained by summing with a threshold value to thus determine the moving-state or idle state of the camera module. However, the method of determining the moving-state or idle state of the camera module based on the corrected angular velocity signal X(n) described above is only an example, and may be modified in various ways.

In addition, the idle state determiner 220 filters the corrected angular velocity signal X(n) and determines the moving-state or idle state of the camera module based on the filtered corrected angular velocity signal. To this end, the idle state determiner 220 includes a low pass filter disposed in an input terminal receiving the corrected angular velocity signal X(n). The low pass filter improves a signal to noise ratio (SNR) of the corrected angular velocity signal Xn to allow the moving-state or idle state of the camera module to be determined without calibrating a threshold value for the lens module 300.

The idle state determiner 220 outputs a control signal Sc to the angular velocity calculator 210 according to the idle state decision. In addition, the idle state determiner 220 may output a control coefficient Coef to the lens controller 230 according to the idle state decision. In this case, the idle state determiner 220 gradually decreases and outputs the control coefficient Coef to a value corresponding to a zero point (for example, 0) in the idle state in a case in which the camera module is in the idle state. The lens controller 230 receives the angular position signal Po and the control coefficient Coef and outputs a control signal to the lens module 300. In addition, the lens controller 230 may receive feedback information output by the lens module 300 in order to calculate corrected position information and reflect the corrected position information in the control signal. The control coefficient Coef may be a plurality of control coefficients for a proportional integral derivative control (PID) controller included in the lens controller 230.

The lens driver 310, included in the lens module 300, receives the control signal to adjust a position of a lens barrel (not illustrated) supporting a lens or a lens group. The lens driver 310 may be a voice coil motor (VCM) using electromagnetic force of a coil and a magnet, an ultrasonic motor using a piezoelectric element, or a shape memory alloy driven by a current. In addition, the position sensor 320 detects position information of the lens supported by the lens barrel moved by the lens driver 310 to output the feedback information.

Since there is a limit to the amount the lens or lens barrel may be adjusted, or moved, by the lens driver 310, an upper limit and a lower limit for the angular position signal Po input from the idle state determiner 220 to the lens controller 230 may be set as a clipping range.

Figure 2:
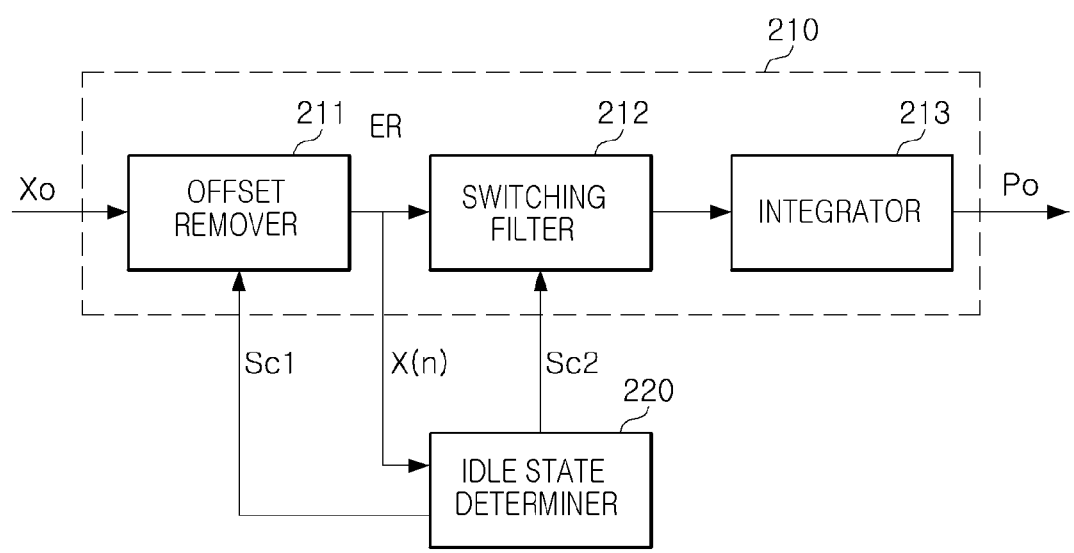
FIG. 2 is a block diagram illustrating an example of an angular velocity calculator of the camera module.

Referring to FIG. 2, the angular velocity calculator 210 includes an offset remover 211, a switching filter 212, and an integrator 213. The offset remover 211 and the switching filter 212 performs the correction on the angular velocity signal Xo in order to remove the bias offset included in the angular velocity signal Xo by the noise component at the time of detecting the rotation angle by the angular velocity sensor 100 (see FIG. 1). In addition, the integrator 213 integrates the filtered corrected angular velocity signal from the switching filter 212 to output an angular position signal.

The offset remover 211 sets a direct current (DC) offset and adds and subtracts the DC offset to and from the angular velocity signal Xo in order to remove the bias offset included in the angular velocity signal Xo. To this end, the offset remover 211 receives a first control signal Sc1, corresponding to the idle state, from the idle state determiner 220, estimates the bias offset included in the angular velocity signal Xo, and updates the DC offset with the estimated bias offset.

For instance, in a case in which the bias offset is generated due to accumulation of the noise component at the time of detecting the rotation angle by the angular velocity sensor 100 (see FIG. 1), a significant transient time (for example, several tens of seconds) may be required for the switching filter 212 to remove the noise component. Therefore, the offset remover 211 removes the DC offset from the angular velocity signal Xo as preprocessing for filtering. However, in a case in which the camera module is in the moving-state at the time of driving initiation of the optical image stabilizer, the DC offset is not set. Therefore, a transient response for removing the bias offset appears for a relatively long time. In order to improve the transient response described above, the switching filter 212 includes a first filter and a second filter.

Since the noise component appears as a specific frequency, the first and second filters are high pass filters in order to remove the noise component. The high pass filter, a digital filter, may be an infinite impulse response (IIR) filter performing filtering by recursively applying an input signal and an output signal. A transfer function (that is, H(z)) of the IIR filter may be derived as represented by the following Equation 1:

$$H(z) = \frac{B(z)}{A(z)} = \frac{b_0 + b_1 z^{-1} + b_2 z^{-2} + \ldots + b_N z^{-N}}{1 + a_1 z^{-1} + a_2 z^{-2} + \ldots + a_M z^{-M}}. \quad \text{[Equation 1]}$$

Here, state coefficients ($b_0$ to $b_N$ and $a_1$ to $a_M$) of the IIR filter are input according to characteristics of a filter to be modeled in advance. In addition, the switching filter 121 receives a second control signal Sc2 from the idle state determiner 220.

In a case in which the second control signal Sc2 corresponding to the moving-state is input, the switching filter 212 filters the corrected angular velocity signal using the second filter during a stabilization time and subsequently filters the corrected angular velocity signal using the first filter switched from the second filter. In addition, while the camera module is in the idle state, the switching filter 212 filters the corrected angular velocity signal X(n) using the first filter.

The first and second filters may be high pass filters having different cut-off frequencies, and a cut-off frequency of the second filter is higher than that of the first filter. Therefore, in the optical image stabilizer, the transient response time required for removing the bias offset is shortened through switching between the high pass filters having the different cut-off frequencies.

Figure 3:
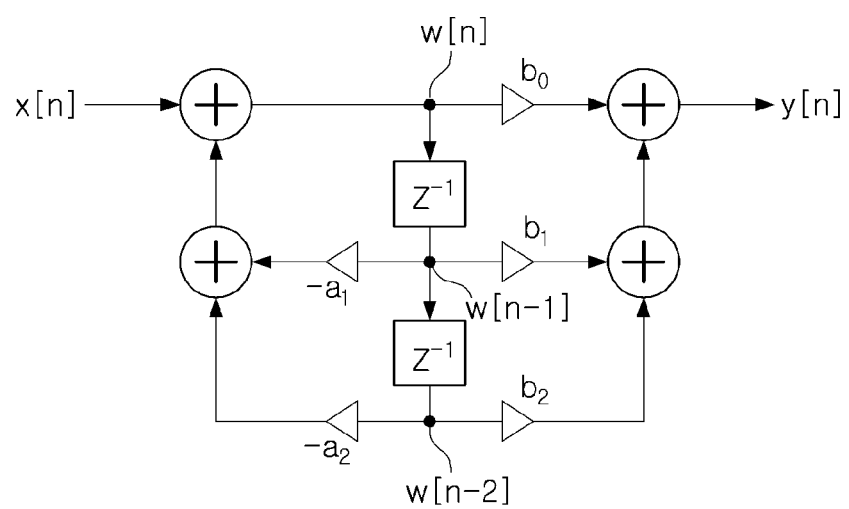
FIG. 3 is a block diagram of an example of a high pass filter.

The high pass filter illustrated in FIG. 3 may be a biquad filter, for example, for implementing an IIR filter. Since the high pass filter illustrated in FIG. 3 has a single delay line, the high pass filter has a second direct type structure in which the number of delay elements are decreased. This high pass filter has state values of w[n], w[n−1], and w[n−2].

The switching filter 212 (see FIG. 2) included in the optical image stabilizer sets a state value of the first filter based on a state value of the second filter at the time of switching from the second filter to the first filter after filtering the corrected angular velocity signal using the second filter. An operation of setting the state value of the first filter based on the state value of the second filter will be described below with reference to FIG. 6.

Figure 4:
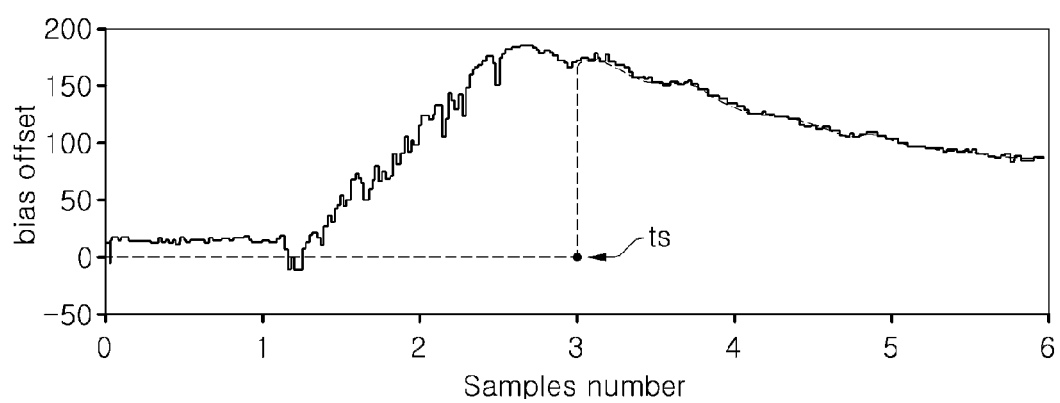
FIG. 4 is a graph illustrating an influence of a bias offset at the time of driving initiation of an optical image stabilizer.

FIG. 4 is a graph illustrating an influence of a bias offset at the time of driving initiation of an optical image stabilizer. Referring to FIG. 4, the bias offset (represented by a solid line) is generated due to the accumulation of the noise component at the time of detecting the rotation angle by the angular velocity sensor 100 (see FIG. 1). Since the DC offset is not set at the time ts of driving initiation of the optical image stabilizer and is not updated in the case in which the camera module is in the moving-state, the bias offset (represented by a dotted line) is input at a significant magnitude at the time ts of driving initiation of the optical image stabilizer. The bias offset at the time ts of driving initiation of the optical image stabilizer allows the transient response for removing the bias offset in the angular velocity signal Xo to be continued for a long time.

Figure 5:
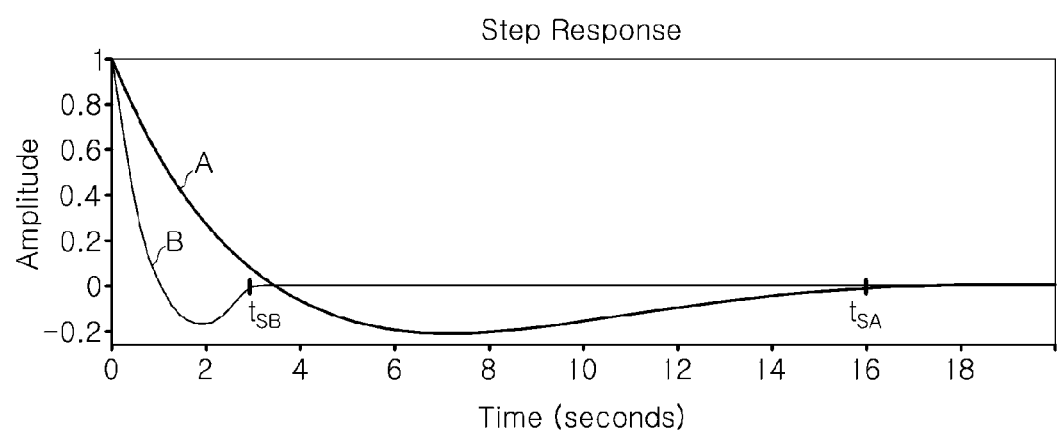
FIG. 5 is a graph illustrating a transient response of a high pass filter.

Referring to FIG. 5, a filter A having a relatively low cut-off frequency shows a transient response time $t_{SA}$ relatively longer than a transient response time $t_{SB}$ of a filter B having a relatively high cut-off frequency. As described above, the optical image stabilizer uses the high pass filters in order to remove the bias offset in the angular velocity signal.

Since the corrected angular velocity signal is filtered using a filter having a relatively high cut-off frequency during a stabilization time at the time of initially driving the optical image stabilizer and is then filtered using a filter having a relatively low cut-off frequency, switched from the filter having the relatively high cut-off frequency, the transient response time is shortened, and accuracy of an optical image stabilization operation is maintained.

As described above with reference to FIG. 3, the high pass filter has the state values w[n], w[n−1], and w[n−2].

Figure 6:
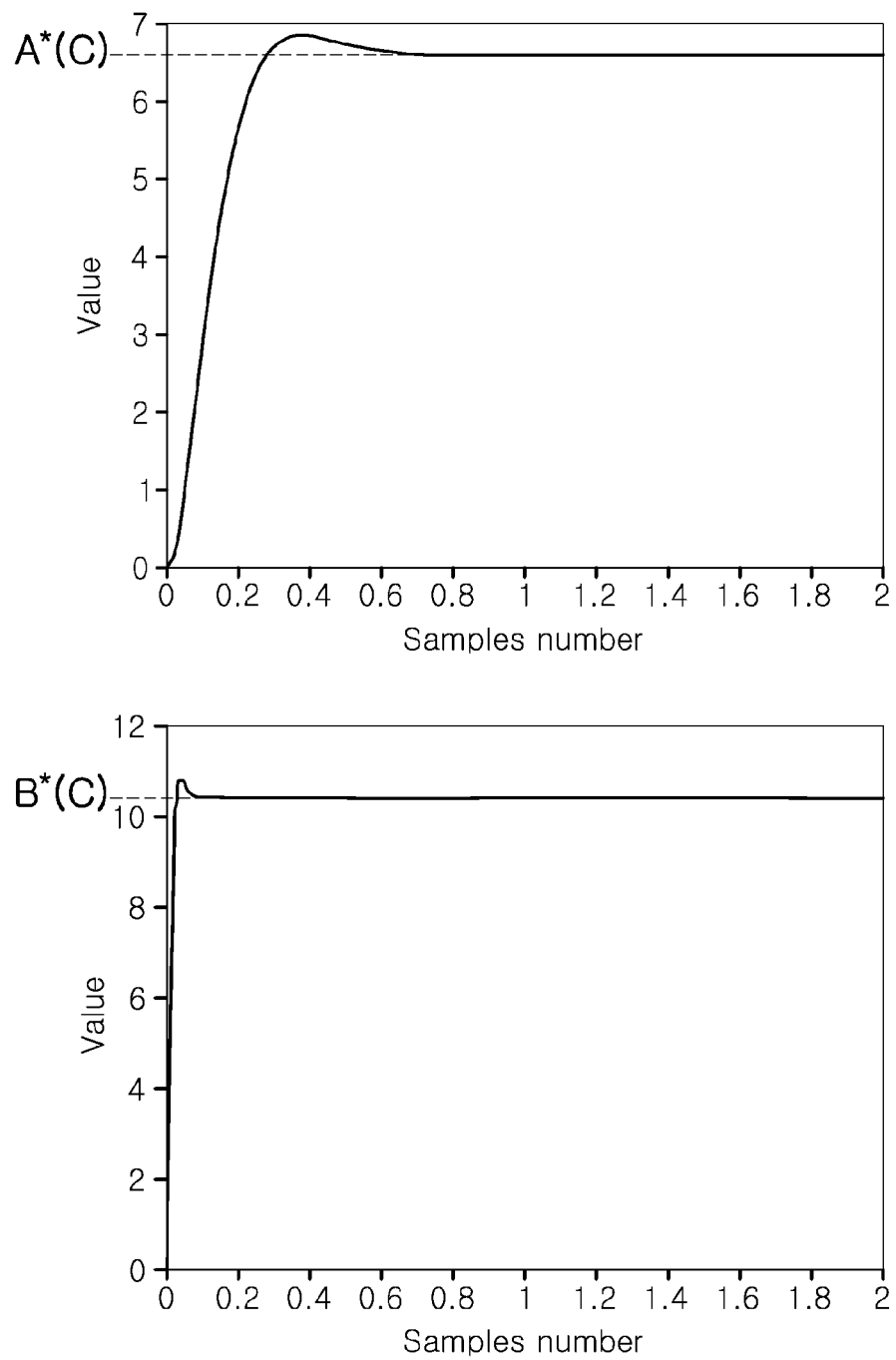
FIG. 6 are graphs illustrating a filter state value of the optical image stabilizer.

FIG. 6 illustrates that different values are output when filter operators for calculating the state values of the filter A and the filter B having the different cut-off frequencies are defined as A* and B* and an integer C is input. Since the angular velocity signal actually input to the filters includes a bias offset component and a high frequency component, in a case in which the bias offset component and the high frequency component are input, the state values ($FS_A$ and $FS_B$) of the filter A and the filter B may be represented by the following Equation 2:

$$FS_A = A^*(\text{bias}) + HFC$$

$$FS_B = B^*(\text{bias}) + HFC. \quad \text{[Equation 2]}$$

Here, bias is a bias offset component, and HFC is a high frequency component.

Setting the state value of the first filter based on the state value of the second filter at the time of switching from the second filter B to the first filter A after filtering the corrected angular velocity signal using the second filter B may be represented by the following Equation 3:

$$FS_A = FS_B + A^*(\text{bias}) - B^*(\text{bias}). \quad \text{[Equation 3]}$$

Therefore, continuity of a filtering operation is ensured since the switching filter 212 (see FIG. 2) included in the optical image stabilizer sets the state value of the first filter based on the state value of the second filter at the time of switching from the second filter to the first filter, after filtering the corrected angular velocity signal using the second filter.

Figure 7A:
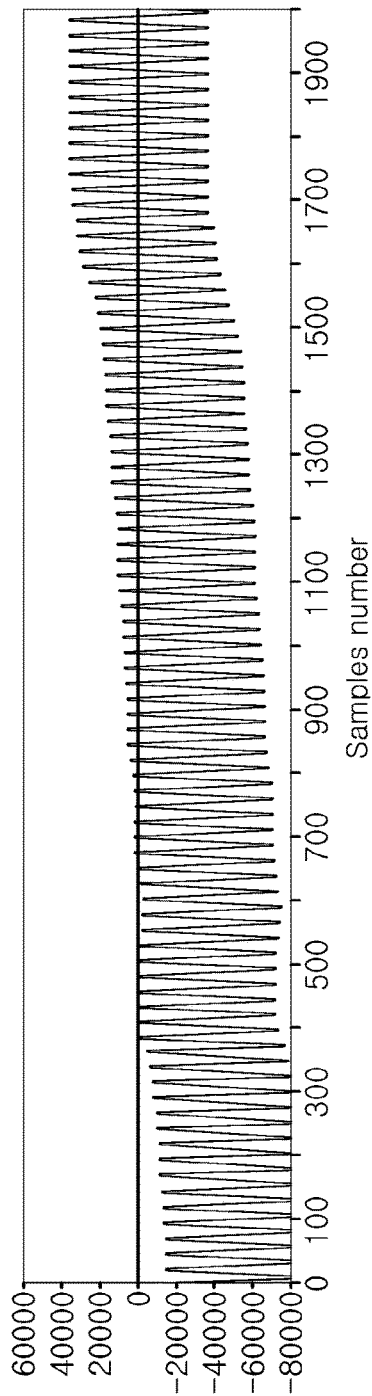
FIGS. 7A and 7B are graphs illustrating a simulation result of the optical image stabilizer.
Figure 7B:
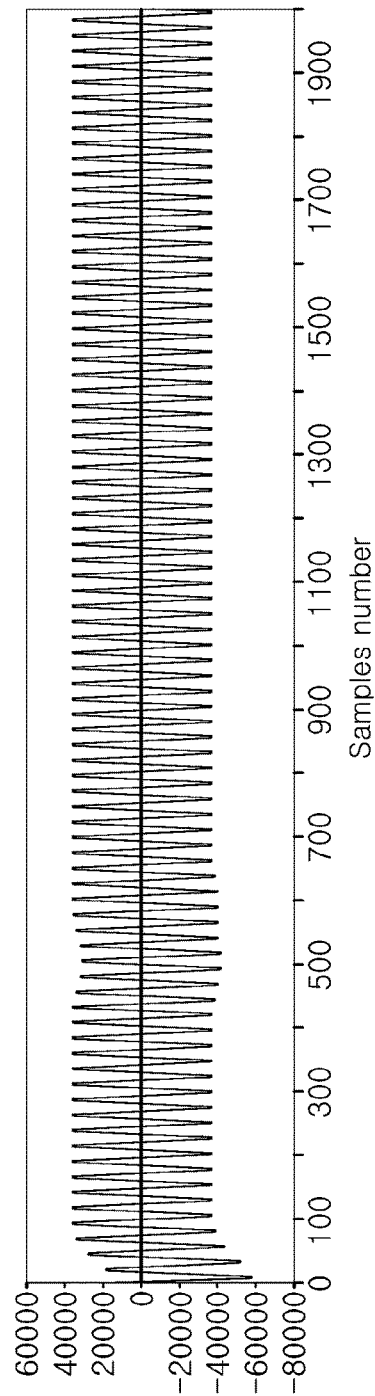

FIG. 7A illustrates an angular position signal at the time of initially driving an optical image stabilizer according to the related art; and FIG. 7B illustrates an angular position signal at the time of initially driving the optical image stabilizer.

Referring to FIGS. 7A and 7B, a transient response time by the bias offset at the time of driving initiation of the optical image stabilizer is shortened in the angular velocity signal of the optical image stabilizer. As set forth above, in the optical image stabilizer, the transient response time by the bias offset at the time of driving initiation of the optical image stabilizer is shortened.

The apparatuses, units, devices, and other components illustrated in FIGS. 1-3 that perform the operations described herein with respect to FIGS. 1-3 are implemented by hardware components. Examples of hardware components include controllers, calculators, determiners, removers, filters sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a mobile device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilizer comprising:
   an offset remover configured to remove a direct current offset of an angular velocity signal and output a corrected angular velocity signal;
   an idle state determiner configured to determine a moving-state or an idle state of the optical image stabilizer based on the corrected angular velocity signal;
   a switching filter configured to filter the corrected angular velocity signal using a second filter during a stabilization time and subsequently filter the corrected angular velocity signal using a first filter switched from the second filter in response to the optical image stabilizer being in the moving-state; and
   an integrator configured to integrate the filtered corrected angular velocity signal from the switching filter to output an angular position signal.

2. The optical image stabilizer of claim 1, wherein the first and second filters are high pass filters having different cut-off frequencies.

3. The optical image stabilizer of claim 1, wherein the switching filter is further configured to filter the corrected angular velocity signal using the first filter in response to the optical image stabilizer being in the idle state.

4. The optical image stabilizer of claim 1, wherein the offset remover is further configured to estimate a bias offset included in the angular velocity signal and update the direct current offset with the estimated bias offset in response to the optical image stabilizer being in the idle state.

5. The optical image stabilizer of claim 4, wherein the offset remover is further configured not to update the direct current offset with the estimated bias offset during the moving-state of the optical image stabilizer.

6. The optical image stabilizer of claim 1, wherein the second filter has a cut-off frequency higher than that of the first filter.

7. The optical image stabilizer of claim 1, wherein the switching filter is further configured to set a state value of the first filter based on a state value of the second filter at the time of switching the second filter to the first filter after filtering the corrected angular velocity signal using the second filter.

8. The optical image stabilizer of claim 1, wherein the idle state determiner is further configured to low-pass-filter the corrected angular velocity signal and determine whether the optical image stabilizer is in the moving state or the idle state based on the low-pass-filtered corrected angular velocity signal.

9. The optical image stabilizer of claim 1, wherein the offset remover is further configured to operate independently of the second filter and the first filter of the switching filter.

10. The optical image stabilizer of claim 1, wherein the offset remover is further configured to remove the direct current offset of the angular velocity signal only during the idle state of the optical image stabilizer.

11. A camera module comprising:
an offset remover configured to remove a direct current offset of an angular velocity signal and output a corrected angular velocity signal;
an idle state determiner configured to determine a movement state or an idle state of the camera module based on the corrected angular velocity signal;
a switching filter configured to filter the corrected angular velocity signal using a second filter during a stabilization time and subsequently filter the corrected angular velocity signal using a first filter switched from the second filter in response to the camera module being in the moving-state;
an integrator configured to integrate the filtered corrected angular velocity signal from the switching filter to output an angular position signal;
a lens controller configured to output a control signal based on the angular position signal; and
a lens module configured to adjust a position of a lens barrel according to the control signal.

12. The camera module of claim 11, wherein the first and second filters are high pass filters having different cut-off frequencies.

13. The camera module of claim 11, wherein the switching filter is further configured to filter the corrected angular velocity signal using the first filter in response to the camera module being in the idle state.

14. The camera module of claim 11, wherein the offset remover is further configured to estimate a bias offset of the angular velocity signal and update the direct current offset with the estimated bias offset in response to the camera module being in the idle state.

15. The camera module of claim 14, wherein the offset remover is further configured not to update the direct current offset with the estimated bias offset during the moving-state of the camera module.

16. The camera module of claim 11, wherein the second filter has a cut-off frequency higher than a cut-off frequency of the first filter.

17. The camera module of claim 11, wherein the switching filter is further configured to set a state value of the first filter based on a state value of the second filter at the time of switching the second filter to the first filter after filtering the corrected angular velocity signal using the second filter.

18. The camera module of claim 11, wherein the idle state determiner is further configured to low-pass-filter the corrected angular velocity signal and determine whether the camera module is in the movement state or the idle state based on the low-pass-filtered corrected angular velocity signal.

19. The camera module of claim 11, wherein the offset remover is further configured to operate independently of the second filter and the first filter of the switching.

20. The camera module of claim 11, wherein the offset remover is further configured to remove the direct current offset of the angular velocity signal only during the idle state of the camera module.

* * * * *